United States Patent [19]

Kühlig et al.

[11] Patent Number: 5,191,001
[45] Date of Patent: Mar. 2, 1993

[54] PROCESS FOR THE PRODUCTION OF SOLVENTLESS POLYCARBONATE

[75] Inventors: Steffen Kühlig, Krefeld; Ralf Pakull, Cologne; Ulrich Grigo, Kempen; Peter Tacke, Krefeld; Dieter Freitag, Krefeld; Wolfgang Alewelt, Krefeld, all of Fed. Rep. of Germany

[73] Assignee: Bayer Aktiengesellschaft, Leverkusen Bayerwerk, Fed. Rep. of Germany

[21] Appl. No.: 774,443

[22] Filed: Oct. 10, 1991

[30] Foreign Application Priority Data

Oct. 17, 1990 [DE] Fed. Rep. of Germany ....... 4032924

[51] Int. Cl.⁵ ..................... C08G 63/64; C08G 63/80; C08G 63/82
[52] U.S. Cl. ................... 524/125; 524/141; 528/125; 528/126; 528/128; 528/173; 528/176
[58] Field of Search ............. 528/370, 176, 196, 198, 528/274, 125, 126, 128, 173; 524/125, 141

[56] References Cited

U.S. PATENT DOCUMENTS

| | | | |
|---|---|---|---|
| 4,102,940 | 7/1978 | Thom et al. | 528/25 |
| 4,395,534 | 7/1983 | Shimizu et al. | 528/126 |
| 4,645,806 | 2/1987 | Freitag et al. | 525/462 |
| 4,740,554 | 4/1988 | Kress et al. | 525/67 |
| 4,927,903 | 5/1990 | Schreckenberg et al. | 528/176 |
| 4,948,871 | 8/1990 | Fukuoka et al. | 528/481 |
| 4,973,652 | 11/1990 | Ebert et al. | 528/198 |

FOREIGN PATENT DOCUMENTS 1-271426 10/1989 Japan.
9007536 7/1990 World Int. Prop. O. .

Primary Examiner—Morton Foelak
Assistant Examiner—Shelley Wright
Attorney, Agent, or Firm—Joseph C. Gil; Aron Preis

[57] ABSTRACT

A three-step process for the production of solventless polycarbonate is disclosed. Accordingly, a mixture of two different oligocarbonates each prepared by the interfacial method, is prepared in the first process step. In a second step, the mixture is crystallized. The third step entails polycondensation. In an additional embodiment of the invention the first step uses a mixture of one oligocarbonate with a suitable monomer.

11 Claims, No Drawings

PROCESS FOR THE PRODUCTION OF SOLVENTLESS POLYCARBONATE

The present invention relates to a process for the production of solventless polycarbonate having an $M_w$ in the range from 15,000 to 200,000 and a % by weight OH terminal group content of <250 ppm, characterized in that 1. two different, specifically terminated oligocarbonates corresponding to formulae 1 and 2 below are prepared by the interfacial method:

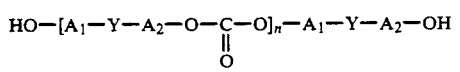

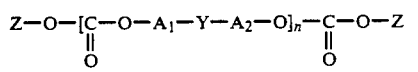

in which
$A_1$, $A_2$=independent, difunctional carbocyclic or heterocyclic aromatic groups,
Y=a divalent group or a single bond,
Z=alkyl or aryl groups and
n=numbers of 1 to 75, 2. a mixture of the two different oligomers corresponding to formulae 1 and 2 or a mixture of an oligomer/monomer corresponding to formulae 1 and 3 or to formulae 2 and 4

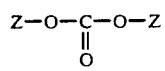

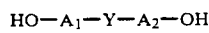

in which
$A_1$, $A_2$=independent, difunctional carbocyclic or heterocyclic aromatic groups,
Y=a divalent group or a single bond,
Z=alkyl or aryl groups, is crystallized
and 3. is then polycondensed in the solid-phase.

Preferred difunctional groups —Y— are alkylene, alkylidene, cycloalkylene, cycloalkylidene, —S—, —O—,

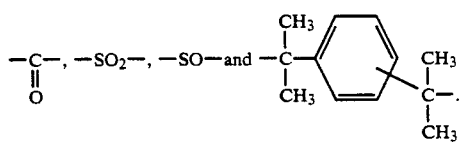

The production of aromatic oligo-/polycarbonates by the interfacial method is known from the literature and is described in DE-PS 959 947, 971 777, 971 790 and 1 007 996 or, for example, in JP 99 619. The crystallization of oligo-/polycarbonates is described, for example, in J. Polymer Sci. Part A-2, 4, 327 (1966); J. Polymer Sci. Phy. Ed. 14, 1367 (1976); J. Polymer Sci. Polymer Letters Ed. 16, 419 (1978); U.S. Pat. Nos. 3,112,292 and 4,631,338. The solid-phase post-condensation of oligocarbonates prepared by transesterification in the melt is described in European patent application 338 085 while the solid-phase post-condensation of oligocarbonates synthesized by the interfacial method is described in Japanese patent application JP 99 619.

The precondition for obtaining the polycarbonate from the oligocarbonate in a short time, for example less than 8 hours, by solid-phase post-condensation is a terminal OH group content of >30%*.

$$*X\% = \frac{\text{number of terminal OH groups}}{\text{total number of terminal groups}} \times 100$$

However, if the terminal OH group content is above 45%, the % by weight OH terminal group content in the resulting polycarbonate rises to more than 250 ppm.

It is known that % by weight OH terminal group contents of more than 250 ppm in the polycarbonate lead to relatively poor thermal stabilities and to relatively high yellowing of the polycarbonate. Thus, to obtain a polycarbonate having good properties, a crystalline oligocarbonate having a terminal OH group content of 30 to 45% should be used in the solid-phase post-condensation reaction.

However, numerous tests have shown that controlled oligomer synthesis, which is thus necessary and which always leads to oligomers having a terminal OH group content of 30 to 45%, is difficult to carry out reproducibly by the interfacial method.

It has now been found that, by suitably mixing the two different specifically terminated oligomers of formulae 1 and 2 or a mixture of an oligomer/monomer corresponding to formulae 1 and 3 or to formulae 2 and 4, it is possible to obtain a mixture having the desired terminal OH group content of 30 to 45% which, after crystallization, can surprisingly be polycondensed in the solid phase to the aromatic, solventless polycarbonate having a % by weight OH terminal group content of <250 ppm.

The oligocarbonates corresponding to formulae 1 and 2 and the monomers corresponding to formula 4 are based, for example, on the following diphenols: dihydroxydiphenyls, bis-(hydroxyphenyl)-alkanes, bis-(hydroxyphenyl)-cycloalkanes, bis-(hydroxyphenyl)-sulfides, bis-(hydroxyphenyl)ethers, bis-(hydroxyphenyl)-ketones, bis-(hydroxyphenyl)sulfones, bis-(hydroxyphenyl)-sulfoxides, $\alpha,\alpha'$-bis-(hydroxyphenyl)-diisopropylbenzenes and nucleus-alkylated or nucleus-halogenated compounds thereof.

Preferred diphenols are, for example, 2,2-bis-(4-hydroxyphenyl)-propane, 2,4-bis-(4-hydroxyphenyl)-2-methylbutane, 1,1-bis-(4-hydroxyphenyl)-p-diisopropylbenzene, 2,2-bis-(3-methyl-4-hydroxyphenyl)-propane, 2,2-bis-(3-chloro-4-hydroxyphenyl)-propane, bis-(3,5-dimethyl-4-hydroxyphenyl)-methane, 2,2-bis-(3,5-dimethyl-4-hydroxyphenyl)-propane, bis-(3,5-dimethyl-4-hydroxyphenyl)-sulfone, 2,4-bis-(3,5-dimethyl-4-hydroxyphenyl) p-diisopropylbenzene, 1,1-bis-(3,5-dimethyl-4-hydroxyphenyl)-2-methyl butane, 2,2-bis-(3,5-dichloro-4-hydroxyphenyl)-propane, 2,2-bis-(3,5-dibromo-4-hydroxyphenyl)-propane and 1,1-bis-(4-hydroxyphenyl)-3,3,5-trimethyl cyclohexane.

Particularly diphenols are, for example, 4,4'-dihydroxydiphenyl, 4,4'-dihydroxydiphenyl sulfide, 2,2-bis-(4-hydroxyphenyl)-propane, 2,2-bis-(3,5-dimethyl-4-hydroxyphenyl)-propane, 2,2-bis-(3,5-dichloro-4-hydroxyphenyl)propane, 2,2-bis-(3,5-dibromo-4 hydroxyphenyl)-propane, 1,1-bis-(4-hydroxyphenyl)-cyclohexane and 1,1-bis-(4-hydroxyphenyl)-3,3,5-trimethyl cyclohexane.

The oligocarbonates may be branched by the use of small quantities of branching agents. The following are suitable branching agents: phloroglucinol, 4,6-dimethyl-2,4,6-tri-(4-hydroxyphenyl)-hept-2-ene, 4,6-dimethyl-2,4,6-tri-(4-hydroxyphenyl)-heptane, 1,3,5-tri-(4-hydroxyphenyl)benzene, 1,1,1-tri-(4-hydroxyphenyl)-ethane, tri-(4-hydroxyphenyl)-phenylmethane, 2,2-bis-(4,4 bis-(4-hydroxyphenyl)-cyclohexyl)-propane, 2,4-bis-(4-hydroxyphenylisopropyl)-phenol, 2,6-bis-(2-hydroxy-5'-methylbenzyl)-4-methylphenol, 2-(4-hydroxyphenyl)-2-(2,4-dihydroxyphenyl)propane, hexa-(4-(4-hydroxyphenylisopropyl) phenyl)-orthoterephthalic acid ester, tetra-(4-hydroxyphenyl)-methane, tetra-(4-(4-hydroxyphenylisopropyl)-phenoxy)-methane, 1,1-bis-((4',4''-dihydroxytriphenyl)-methyl)-benzene and, in particular, $\alpha,\alpha',\alpha''$-tris-(4-hydroxyphenyl)-1,3,5-triisopropenyl benzene.

Other possible branching agents are 2,4-dihydroxybenzoic acid, trimesic acid, cyanuric chloride and 3,3-bis-(3-methyl-4-hydroxyphenyl)-2,3-dihydroindole.

The 0.05 to 2 mol-%—based on mols diphenols used—of the optional branching agents may either be introduced with the diphenols themselves in the aqueous alkaline phase or may be added in an organic solvent (before phosgenation).

However, branching may also be carried out by the addition of the branching agents to the specifically terminated linear oligomers corresponding to formulae 1 and 2 or to the mixture of an oligomer/monomer corresponding to formulae 1 and 3 or to formulae 2 and 4, which are then crystallized together and subjected to post-condensation in the solid phase. A combination of both methods of branching in steps 1 and 2 is also possible.

The aromatic oligocarbonates of the 1st step of the process according to the invention should have average molecular weight $\overline{M}_w$ in the range from 1,000 to 17,000 and preferably in the range from 2,000 to 10,000, as determined by measurement of the relative solution viscosity in dichloromethane or mixtures of equal quantities by weight of phenol/o-dichlorobenzene or by the light scattering method. Preferred oligocarbonates contain at least 50 mol-% co-condensed bisphenol A, based on mols co-condensed diphenols.

In the first step of the process, the oligocarbonate corresponding to formula 1 is synthesized by the interfacial method in the absence of molecular weight regulators, the catalysts used (for example Lewatit, trimethyl amine) largely having a chlorine-hydrolyzing function and no molecular-weight-increasing function.

To limit the molecular weights $\overline{M}_w$ of the oligomer corresponding to formula 2 in the first step of the process, molecular weight regulators, such as for example phenol, alkylphenol, phenyl chlorocarbonic acid esters or alkyl chlorocarbonic acid esters, are used in known manner in calculated quantities or in quantities determined by trial and error.

The choice of the molecular weight regulator(s) in the 1st step determins the volatile condensation products formed in the 3rd step of the process according to the invention. Phenol as chain terminator in the solid-phase post-condensation gives phenol carbonate and, possibly, diphenol carbonate while alkyl chlorocarbonic acid ester gives alcohol and possibly, dialkyl carbonate.

Phenols and alkyl chlorocarbonic acid esters are used as molecular weight regulators.

In the second step of the process, the oligomer mixture or oligomer/monomer mixture is crystallized by concentration of their solutions, by crystallization with shearing, by doping with already crystallized material or by precipitation with precipitants. Examples of suitable precipitants are inter alia methanol, cyclohexane, acetone, isopropanol, water, heptane, hexane.

The polycarbonates obtained in the solid-phase post-condensation reaction in the 3rd step of the process according to the invention should reach $M_w$ values in the range from 15,000 to 200,000 and preferably in the range from 20,000 to 60,000 and a % by weight OH terminal group content of <250 ppm and preferably <175 ppm.

For the solid-phase post-condensation, the partly crystalline oligomer/monomer mixtures are heated in vacuo and/or in an inert gas, for example nitrogen, argon, carbon dioxide, to temperatures below the crystallite melting point, for example by heating to 180° C., increasing the temperature from 180° C. to 220° C. over a period of 2 hours, followed by solid-phase post-condensation at 220° C. in order to produce a low partial pressure and to remove the monomers formed during the reaction, the particles of the precondensates neither softening nor sticking, i.e. agglomerating. Accordingly, the temperature at which the solid-phase post-condensation is carried out is below the melting temperature $T_m$ of the oligomer and above the glass transition temperature $T_g$ of the oligomer.

It may be of advantage to accelerate the solid-phase post-condensation of the oligocarbonates by using small quantities (1 ppm to 1% by weight) of catalysts. Suitable catalysts are inter alia LiOH, NaOH, $Na_2CO_3$, $Ca(OH)_2$, $CaCO_3$, tetraalkyl titanate, dibutyl dibutoxy tin, quinoline, triphenyl phosphine. Traces of alkali hydroxide are generally sufficient.

Auxiliaries and reinforcing materials may be incorporated in the polycarbonates produced in accordance with the invention to improve their properties. Suitable auxiliaries and reinforcing materials include stabilizers, flow aids, mold release agents, flameproofing agents, pigments, finely divided minerals, fibers, for example alkyl and aryl phosphites, phosphates, phosphines, low molecular weight carboxylic acid esters, halogen compounds, salts, chalk, silica flour, glass and carbon fibers.

In addition, other polymers, for example polyolefins, polyurethanes or polystyrene, may also be incorporated in the polycarbonates according to the invention.

The auxiliaries and additives are incorporated in the final polycarbonate, preferably using conventional machines although, if necessary, they may also be incorporated at any stage of the process according to the invention.

In addition, for special applications, the polycarbonates may also be modified by co-condensation of blocks, OH-terminated segments, more particularly OH-terminated siloxane blocks, OH-terminated aromatic and aliphatic polyesters, OH-terminated polyphenylene sulfide blocks or OH-terminated polyphenylene oxide blocks. These blocks may be incorporated by condensation in the 1st step of the process according to the invention and preferably in the 3rd step of the process.

The polycarbonates produced in accordance with the invention may be processed to semifinished products, moldings and films using standard machines. These products are used, for example, in the electrical field and in vehicle manufacture.

EXAMPLE 1 a. Procedure for the synthesis of a specifically aryl-terminated oligomer corresponding to formula 2:

In a 2 liter three-necked flask equipped with a stirrer, dropping funnel and gas inlet pipe, 342.4 g (1.5 mol) bisphenol A were dissolved under nitrogen in 3432 g distilled water with addition of 192 g NaOH. 23.85 g (0.253 mol) phenol dissolved in 856 ml dichloromethane are added to the clear colorless solution which is then cooled to 20° C. 192.9 g phosgene (1.95 mol) are then introduced into the emulsion with vigorous stirring at a rate of approximately 2 g/minute. The temperature is kept between 20° and 25° C. After the phosgene has been added, 1.6 ml N-ethyl piperidine are introduced and the emulsion is stirred for 45 minutes at room temperature. The phases are then separated and the dichloromethane phase is extracted twice with 500 ml 1% NaOH in a separation funnel. The solution thus treated is acidified with 10% phosphoric acid and subsequently washed free from electrolyte with distilled water. To remove the residual water, the dichloromethane solution is left standing over sodium sulfate and filtered therefrom after half an hour. The filtrate is concentrated by evaporation in a rotary evaporator and the residue is largely freed from the residual solvent in a water jet vacuum for 16 h at 110° C.

A crystalline oligomer having a relative solution viscosity (dichloromethane, 25° C., 5 g/l) of 1.090 ($M_w$=9,000) is obtained.

The phenolic OH content is <0.006% and the hydrolyzable Cl value is <2 ppm. The yield comprises 97% of the theoretical.

b.1 Procedure for the synthesis of a specifically OH-terminated oligomer corresponding to formula 1

In a 2 liter three-necked flask equipped with a stirrer, dropping funnel and gas inlet pipe, 342.2 g (1.5 mol) bisphenol A were dissolved under nitrogen in 3432 g distilled water with addition of 264 g NaOH. 237.4 g phosgene (2.4 mol) are then introduced into the emulsion with vigorous stirring. The temperature is kept between 20° and 25° C. After the phosgene has been added, 2.8 ml trimethyl amine are introduced and the emulsion is stirred for 2 hours at room temperature. The phases are then separated and the dichloromethane phase is extracted twice with 500 ml 1% NaOH in a separation funnel. The solution thus treated is acidified with 10% phosphoric acid and subsequently washed free from electrolyte with distilled water. To remove the residual water, the dichloromethane solution is left standing over sodium sulfate and filtered therefrom after half an hour. The filtrate is concentrated by evaporation in a rotary evaporator and the residue is largely freed from the residual solvent in a water jet vacuum for 16 h at 110° C.

A crystalline oligomer having a relative solution viscosity (dichloromethane, 25° C., 5 g/l) of 1.168 ($M_w$=16,800) is obtained. The phenolic OH content is 0.38% and the hydrolyzable Cl value is <2 ppm. The yield comprises 97% of the theoretical.

b.2

The procedure was as described in Example b.1, except that 91.3 g bisphenol A, 70.4 g NaOH, 915 g distilled water, 685 ml dichloromethane and 63.3 g phosgene were used. 200 g Lewatit MP 500 were used instead of the trimethyl amine. The crystalline oligomer obtained had a relative solution viscosity (dichloromethane, 25° C., 5 g/l) of 1.132 ($M_w$=13,200). The phenolic OH content is <0.41% and the hydrolyzable Cl value is <2 ppm. The yield comprises 88.9% of the theoretical.

6.2 g of the arylcarbonate-terminated oligocarbonate synthesized by the method described in 1.a are dissolved with 6.0 g of the oligocarbonate prepared as described in b.1 in 120 ml dichloromethane, the resulting solution is concentrated by evaporation in a rotary evaporator and the residue is substantially freed from the residual solvent over a period of 16 h in a water jet vacuum at 110° C. A crystalline oligomer having an OH/aryl carbonate terminal group ratio of 40:60 is obtained.

12.2 g of this oligomer are then heated in a glass apparatus under a pressure of 6 mbar and at a through-flow rate of the carrier gas of 6 l nitrogen/h in accordance with the following program: 1 h 180° C.=>200° C. 1 h=220° C., 6 h 220° C. A crystalline colorless polycarbonate having a relative solution viscosity (dichloromethane, 25° C., 5 g/l) of 1.346 ($M_w$=34,600) is obtained. The phenolic OH content is 200 ppm and the residual dichloromethane content is <2 ppm.

EXAMPLE 2

7.2 g of the arylcarbonate-terminated oligocarbonate synthesized by the method described in 1.a are dissolved with 4.8 g of the oligocarbonate prepared as described in b.1 in 120 ml dichloromethane, the resulting solution is concentrated by evaporation in a rotary evaporator and the residue is substantially freed from the residual solvent over a period of 16 h in a water jet vacuum at 110° C. A crystalline oligomer having an OH/aryl carbonate terminal group ratio of 30:70 is obtained.

12.0 g of this oligomer are then heated in a glass apparatus under a pressure of 6 mbar and at a through-flow rate of the carrier gas of 6 l nitrogen/h in accordance with the following program: 1 h 180° C.=>200° C. 1 h=220° C., 6 h 220° C. A Crystalline colorless polycarbonate having a relative solution viscosity (dichloromethane, 25° C., 5 g/l) of 1.248 ($M_w$=24,800) is obtained. The phenolic OH content is 100 ppm and the residual dichloromethane content is <2 ppm.

EXAMPLE 3

As Example 2, except that 4.8 g of the arylcarbonate-terminated oligocarbonate and 7.2 g of the oligocarbonate prepared as described in b.1 are used. (OH/arylcarbonate terminal group ratio 50:50). A crystalline, colorless polycarbonate having a relative solution viscosity (dichloromethane, 25° C., 5 g/l) of 1.417 ($M_w$=41,700) is obtained. The phenolic OH content is 570 ppm and the residual dichloromethane content is <2 ppm.

EXAMPLE 4

As Example 2, except that 10.5 g of the arylcarbonate-terminated oligocarbonate and 4.5 g of the oligocarbonate prepared as described in b.1 are used. (OH/arylcarbonate terminal group ratio 22.5:77.5). A crystalline, colorless polycarbonate having a relative solution viscosity (dichloromethane, 25° C., 5 g/l) of 1.189 ($M_w$=18,900) is obtained. The phenolic OH content is 100 ppm and the residual dichloromethane content is <2 ppm.

EXAMPLE 5

As Example 2, except that 12 g of the arylcarbonate-terminated oligocarbonate and 3 g of the oligocarbonate prepared as described in b.1 are used. (OH/arylcarbonate terminal group ratio 15:85). A crystalline, colorless polycarbonate having a relative solution viscosity (dichloromethane, 25° C., 5 g/l) of 1.170 ($M_w$=17,000) is obtained. The phenolic OH content is 90 ppm and the residual dichloromethane content is <2 ppm.

EXAMPLE 6

As Example 2, except that 4.5 g of the arylcarbonate-terminated oligocarbonate and 10.5 g of the oligocarbonate prepared as described in b.1 are used. (OH/arylcarbonate terminal group ratio 40:60). A crystalline, colorless polycarbonate having a relative solution viscosity (dichloromethane, 25° C., 5 g/l) of 1.423 ($M_w$=42,300) is obtained. The phenolic OH content is 1,000 ppm and the residual dichloromethane content is <2 ppm.

EXAMPLE 7

As Example 2, except that 1.5 g of the arylcarbonate-terminated oligocarbonate and 13.5 g of the oligocarbonate prepared as described in b.1 are used. (OH/arylcarbonate terminal group ratio 85:15). A crystalline, colorless polycarbonate having a relative solution viscosity (dichloromethane, 25° C., 5 g/l) of 1.309 ($M_w$=30,900) is obtained. The phenolic OH content is 2,500 ppm and the residual dichloromethane content is <2 ppm.

EXAMPLE 8

15 g of the arylcarbonate-terminated oligocarbonate synthesized by the method described in 1.a are dissolved in 200 ml dichloromethane together with 0.65 g bisphenol A dissolved in 5 ml methanol, the resulting solution is concentrated by evaporation in a rotary evaporator and the residue is substantially freed from the residual solvent over a period of 16 h in a water jet vacuum at 110° C. A crystalline oligomer is obtained and is heated in a glass apparatus at a throughflow rate of the carrier gas of 6 l nitrogen/h in accordance with the following program: 1 h 180° C.=>200° C., 1 h=>220° C., 1 h 220° C. After this 3 hour heating period, the vacuum (6 mbar) is applied and the mixture is heated for another 5 h. A crystalline colorless polycarbonate having a relative solution viscosity (dichloromethane, 25° C., 5 g/l) of 1.339 ($M_w$=33,900) is obtained. The phenolic OH content is 250 ppm and the residual dichloromethane content is <2 ppm.

EXAMPLE 9

15 g of the arylcarbonate-terminated oligocarbonate synthesized by the method described in 1.a are dissolved in 200 ml dichloromethane together with 0.51 g bisphenol A dissolved in 5 ml methanol, the resulting solution is concentrated by evaporation in a rotary evaporator and the residue is substantially freed from the residual solvent over a period of 16 h in a water jet vacuum at 110° C. A crystalline oligomer is obtained and is heated in a glass apparatus at a throughflow rate of the carrier gas of 6 l nitrogen/h in accordance with the following program: 1 h 180° C.=>200° C. 1 h=>220° C., 1 h=220°C. After this 3 hour heating period, the vacuum (6 mbar) is applied and the mixture is heated for another 5 h. A crystalline colorless polycarbonate having a relative solution viscosity (dichloromethane, 25° C., 5 g/l) of 1.189 is obtained. The phenolic OH content is 190 ppm and the residual dichloromethane content is <2 ppm.

EXAMPLE 10

0.41 g diphenyl carbonate and 7.2 g of the oligocarbonate prepared as described in b.1 are dissolved in 200 ml dichloromethane, the resulting solution is concentrated by evaporation in a rotary evaporator and the residue is substantially freed from the residual solvent over a period of 16 h in a water jet vacuum at 110° C. A crystalline oligomer is obtained and is heated in a glass apparatus at a throughflow rate of the carrier gas of 6 l nitrogen/h in accordance with the following program: 1 h 180° C.=>200° C. 1 h=>220° C., 1 h 220° C. After this 3 hour heating period, the vacuum (6 mbar) is applied and the mixture is heated for another 5 h. A crystalline colorless polycarbonate having a relative solution viscosity (dichloromethane, 25° C., 5 g/l) of 1.273 ($M_w$=27,300) is obtained. The phenolic OH content is 3,500 ppm and the residual dichloromethane content is <2 ppm.

EXAMPLE 11

17 g of the arylcarbonate-terminated oligocarbonate synthesized by the method described in 1.a are dissolved in 200 ml dichloromethane together with 1.07 g 1,1-bis-(4-hydroxyphenyl)-3,3,5-trimethyl cyclohexane dissolved in 5 ml methanol, the resulting solution is concentrated by evaporation in a rotary evaporator and the residue is substantially freed from the residual solvent over a period of 16 h in a water jet vacuum at 110° C. A crystalline oligomer is obtained and is heated in a glass apparatus at a throughflow rate of the carrier gas of 6 l nitrogen/h in accordance with the following program: 1 h 180° C.=>200° C. 1 h=>220° C., 1 h 220° C. After this 3 hour heating period, the vacuum (6 mbar) is applied and the mixture is heated for another 3 h. A crystalline pale yellowish polycarbonate having a relative solution viscosity (dichloromethane, 25° C., 5 g/l) of 1.300 ($M_w$=30,000) is obtained. The phenolic OH content is 190 ppm and the residual dichloromethane content is <2 ppm.

EXAMPLE 12

15 g of the arylcarbonate-terminated oligocarbonate synthesized by the method described in 1.a are dissolved in 200 ml dichloromethane together with 0.57 g 4,4-dihydroxydiphenyl dissolved in 5 ml methanol, the resulting solution is concentrated by evaporation in a rotary evaporator and the residue is substantially freed from the residual solvent over a period of 16 h in a water jet vacuum at 110° C. A crystalline oligomer is obtained and is heated in a glass apparatus at a throughflow rate of the carrier gas of 6 l nitrogen/h in accordance with the following program: 1 h 180° C.=>200° C. 1 h=>220° C., 1 h 220° C. After this 3 hour heating period, the vacuum (6 mbar) is applied and the mixture is heated for another 4 h. A crystalline colorless polycarbonate having a relative solution viscosity (dichloromethane, 25° C., 5 g/l) of 1.330 ($M_w$=33,000) is obtained. The phenolic OH content is 110 ppm and the residual dichloromethane content is <2 ppm.

EXAMPLE 13

15 g of the aryl carbonate-terminated oligocarbonate synthesized by the method described in 1.a are dissolved in 200 ml dichloromethane together with 0.45 g bisphenol A and 0.163 g$\alpha,\alpha',\alpha''$-tris-(4-hydroxyphenyl)-1,3,5-triisopropenyl benzene dissolved in 5 ml methanol, the resulting solution is concentrated by evaporation in a rotary evaporator and the residue is substantially freed from the residual solvent over a period of 16 h in a water jet vacuum at 110° C.

EXAMPLE 14

15 g of the arylcarbonate-terminated oligocarbonate synthesized by the method described in 1.a are dissolved in 200 ml dichloromethane together with 0.70 g 4,4'-dihydroxydiphenyl sulfide dissolved in 5 ml methanol, the resulting solution is concentrated by evaporation in a rotary evaporator and the residue is substantially freed from the residual solvent over a period of 16 h in a water jet vacuum at 110° C.

A crystalline oligomer is obtained and is heated in a glass apparatus at a throughflow rate of the carrier gas of 6 l nitrogen/h in accordance with the following program: 1 h 180° C.=>200° C. 1 h=>220° C., 1 h 220° C. After this 3 hour heating period, the vacuum (6 mbar) is applied and the mixture is heated for another 4 h. A crystalline colorless polycarbonate having a relative solution viscosity (dichloromethane, 25° C., 5 g/l) of 1.277 ($M_w$=27,700) is obtained. The phenolic OH content is 150 ppm and the residual dichloromethane content is <2 ppm.

EXAMPLE 15

15 g of the arylcarbonate-terminated oligocarbonate synthesized by the method described in 1.a are dissolved in 200 ml dichloromethane together with 0.60 g bisphenol A and 0.814 g of a bisphenol-A-terminated polydimethyl siloxane block ($P_n$=65) dissolved in 5 ml methanol, the resulting solution is concentrated by evaporation in a rotary evaporator and the residue is substantially freed from the residual solvent over a period of 16 h in a water jet vacuum at 110° C. A crystalline oligomer is obtained and is heated in a glass apparatus at a throughflow rate of the carrier gas of 6 l nitrogen/h in accordance with the following program: 1 h 180° C.=>200° C. 1 h=>220° C., 1 h 220° C. After this 3 hour heating period, the vacuum (6 mbar) is applied and the mixture is heated for another 4 h. A crystalline colorless polycarbonate having a relative solution viscosity (dichloromethane, 25° C., 5 g/l) of 1.306 ($M_w$=30,600) is obtained. The phenolic OH content is 210 ppm and the residual dichloromethane content is <2 ppm.

EXAMPLE 16

Procedure for the synthesis of a specifically alkyl-terminated oligomer corresponding to formula 2:

In a 2 liter three-necked flask equipped with a stirrer, dropping funnel and gas inlet pipe, 45.7 g (0.2 mol) bisphenol A were dissolved under nitrogen in 696 g distilled water with addition of 48 g NaOH. 7.86 ml (0.1 mol) chloroformic acid methyl ester dissolved in 343 ml dichloromethane are added to the clear colorless solution which is then cooled to 20° C. 39.6 g phosgene (0.4 mol) are then introduced into the emulsion with vigorous stirring at a rate of approximately 2 g/minute. The temperature is kept between 20° and 25° C. After the phosgene has been added, 0.27 ml N-ethyl piperidine are introduced and the emulsion is stirred for 45 minutes at room temperature. The phases are then separated, the dichloromethane phase is acidified with 10% phosphoric acid and is subsequently washed free from electrolyte with distilled water. To remove the residual water, the dichloromethane solution is left standing over sodium sulfate and filtered therefrom after half an hour. The filtrate is concentrated by evaporation in a rotary evaporator and the residue is largely freed from the residual solvent in a water jet vacuum for 16 h at 110° C.

A crystalline oligomer having a relative viscosity (dichloromethane, 25° C., 5 g/l) of 1.151 ($M_w$=15,100) is obtained.

The phenolic OH content is <0.006% and the hydrolyzable Cl value is <2 ppm. The yield comprises 90% of the theoretical.

11.2 g of the synthesized arylcarbonate-terminated oligocarbonate are dissolved in 220 ml dichloromethane together with 6.5 g of the oligocarbonate prepared as described in b.2 and 0.0177 g dibutyl tin dilaurate, the resulting solution is concentrated by evaporation in a rotary evaporator and the residue is substantially freed from the residual solvent over a period of 16 h in a water jet vacuum at 110° C. A crystalline oligomer having an OH:alkylcarbonate terminal group ratio of 40:60 is obtained. 12.2 g of this oligomer are then heated in a glass apparatus under a pressure of 6 mbar and at a throughflow rate of the carrier gas of 6 l nitrogen/h in accordance with the following program: 1 h 180° C.=>200° C. 1 h=>220° C., 6 h 220° C. A crystalline colorless polycarbonate having a relative solution viscosity (dichloromethane, 25° C., 5 g/l) of 1.215 ($M_w$=21,500) is obtained. The phenolic OH content is 155 ppm and the residual dichloromethane content is <2 ppm.

What is claimed is:

1. A process for the production of aromatic solventless aromatic polycarbonate having a weight average molecular weight of 15,000 to 200,000 and terminal OH group content of <250 ppm comprising (i) preparing by the interfacial method oligocarbonates corresponding to formulae 1 and formula 2 :

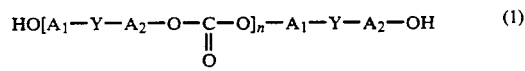

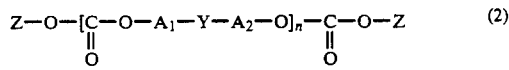

in which $A_1$ and $A_2$ independently denote difunctional carbocyclic or heterocyclic aromatic groups, Y is a divalent group or a single bond, Z is an alkyl or an aryl group and n is an integer of 1 to 75, (ii) preparing a mixture of said oligocarbonates or a mixture of said (1) with a monomer corresponding to formula (3) or of said (2) with a monomer corresponding to formula (4)

in which $A_1$, $A_2$, Y and Z are as defined above, and crystallizing said mixture, and (iii) polycondensing said crystallized mixture in the solid phase.

2. The process of claim 1 wherein the mixture of said oligocarbonate of formula 1 and the monomer of formula 3 has a terminal OH group content of 30 to 45%.

3. The process of claim 1 wherein the mixture of said oligocarbonate of formula 2 and the monomer of formula 4 has a terminal OH group content of 30 to 45%.

4. The process of claim 1 wherein said mixture contains 0 ppm to 1% by weight of at least one condensation catalyst.

5. The process of claim 1 wherein said oligocarbonate has a weight average molecular weight of 1,000 to 17,000.

6. The process of claim 1 wherein at least 50 mole percent of said Y are derived from bisphenol -A.

7. The process of claim 1 wherein said solid-phase post-condensation is carried out at temperatures below the melting temperature and above the glass transition temperature of said oligocarbonate.

8. The process of claim 1 wherein a branching agent is added in said (i) and/or said (ii).

9. The process of claim 1 wherein said crystallization is carried out by concentration of the solutions, by crystallization with shearing, by doping with already crystallized material or by precipitation with precipitant.

10. The process of claim 1 wherein at least one OH terminated block selected from the group consisting of siloxane, aromatic polyester, aliphatic polyester, polyphenylene sulfide and polyphenylene oxide are co-condensed in said (i).

11. The process of claim 1 wherein at least one OH terminated block selected from the group consisting of siloxane, aromatic polyester, aliphatic polyester, polyphenylene sulfide and polyphenylene oxide are co-condensed in said (iii).

* * * * *

UNITED STATES PATENT AND TRADEMARK OFFICE
CERTIFICATE OF CORRECTION

PATENT NO. : 5,191,001
DATED : March 2, 1993
INVENTOR(S) : Steffen Kuhling et al It is certified that error appears in the above-indentified patent and that said Letters Patent is hereby corrected as shown below:

On the title page: Item [19]

In the heading, on line 2, under "United States Patent", delete "Kuhlig et al" and insert --Kuhling et al -- therefor.

Item [75], after "Inventors:". delete "Steffen Kuhlig" and insert --Steffen Kuhling-- therefor.

Column 2, lines 55 and 56, delete "2,4-bis-(3,5-dimetthyl-4hydroxyphenyl) p-diisopropylbenzene" and insert --2, 4-bis-(3,5-dimethyl-4-hydroxyphenyl)-p-diisopropylbenzene--.

column 2, lines 65 and 66, delete "2,2-bis-(3,5-dibromo-4 hydroxyphenyl)-propane" and insert --2,2-bis-(3,5-dibromo-4-hydroxyphenyl)-propane--.

column 3, line 8, delete "(4,4 bis-(4-hydroxyphenyl-cyclohexyl)-propane" and insert --(4,4-bis-(4-hydroxyphenyl)-cyclohexyl)-propane--.

Signed and Sealed this

Eighteenth Day of January, 1994

Attest:

BRUCE LEHMAN

*Attesting Officer*  *Commissioner of Patents and Trademarks*